INVENTORS.
ALFRED B. CAREL
DONALD J. HAASE
BY William A. Mikesell Jr.
ATTORNEY

INVENTORS.
ALFRED B. CAREL
DONALD J. HAASE
BY William A. Mikesell Jr.
ATTORNEY

United States Patent Office

3,496,702
Patented Feb. 24, 1970

3,496,702
CHROMATOGRAPHIC ANALYSIS METHOD AND APPARATUS
Alfred B. Carel, Ponca City, Okla., and Donald J. Haase, Houston, Tex., assignors to Continental Oil Company, Ponca City, Okla., a corporation of Delaware
Filed Oct. 14, 1968, Ser. No. 767,326
Int. Cl. B01d *15/08*
U.S. Cl. 55—67                                9 Claims

ABSTRACT OF THE DISCLOSURE

Sample is introduced into a GLC (gas-liquid chromatography) column by saturating with it a measured slug of carrier gas; sample size and column temperature are controlled to prevent column flooding. In one embodiment, compensation is provided in the column for loss of pressure due to partial condensation of the sample.

---

Figure 1:
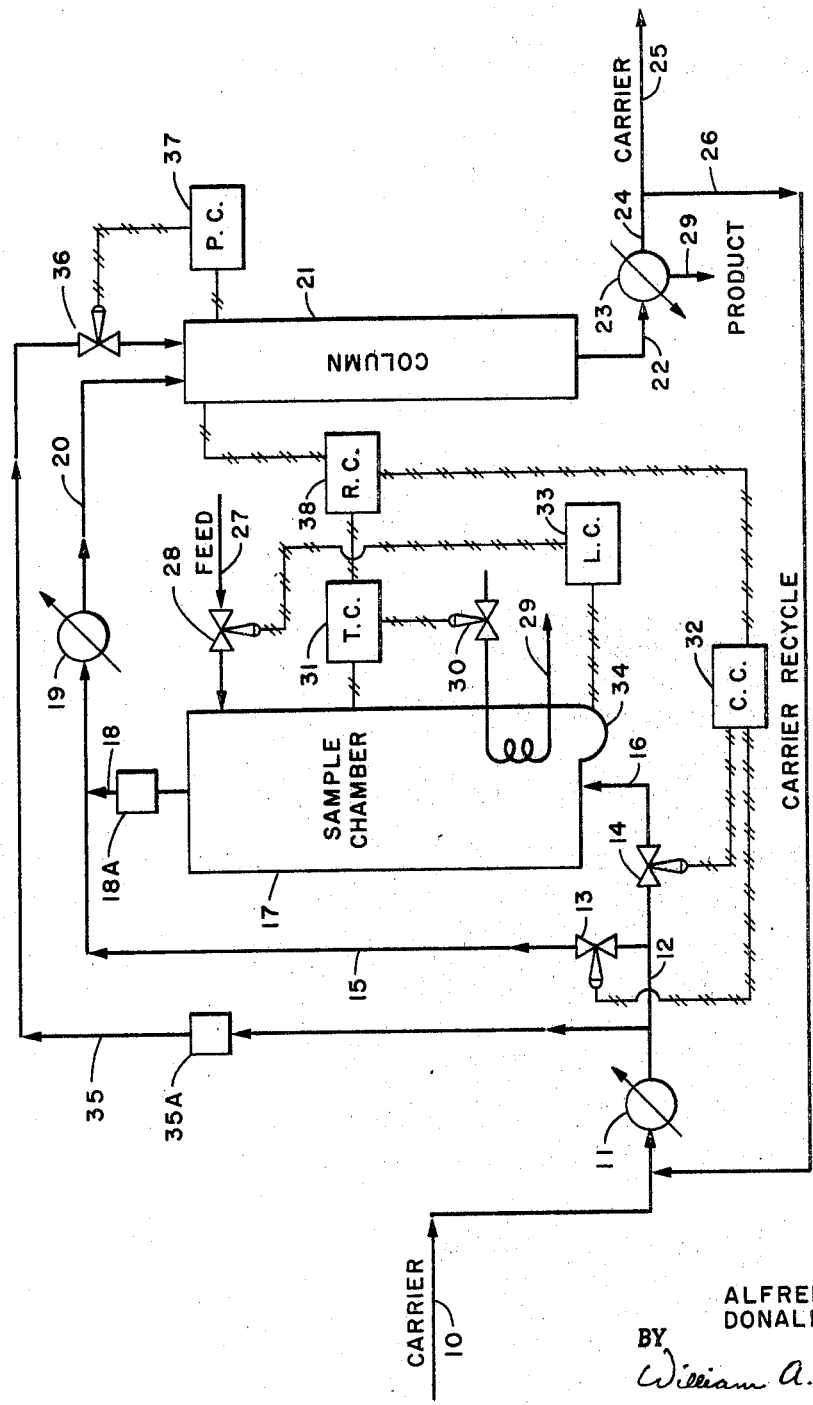

This invention relates to improvements in GLC separations, and more particularly to method and apparatus for introducing feed into the column.

GLC separation has been widely used as an analytical tool, and recently has come under consideration and use for large-scale or so-called "preparative" separation of materials which are otherwise difficulty separable. GLC involves, briefly, passing the mixture to be separated, in the form of a gas or vapor, into contact with a liquid substrate which is chosen to selectively retard the components of the mixture; the liquid substrate is normally in the form of a film or coating deposited on particulate solids as a support, which can then be packed into a column. The mixture is typically carried through the packed zone by a flowing stream of carirer gas which is inert to the system. However, the use of increasingly larger diameter columns, with their attendant larger feed or "sample" capacity, has resulted in problems in introducing the feed to the column. One of the more serious of these problems is the presence of feed in the liquid state at or near the column entrance, whether by condensation of feed vapor or by introduction of feed as liquid slugs. Such liquid washes or "strips" the substrate liquid from the packing, resulting in lower column efficiency and eventually requiring re-packing of the column.

Figure 2:
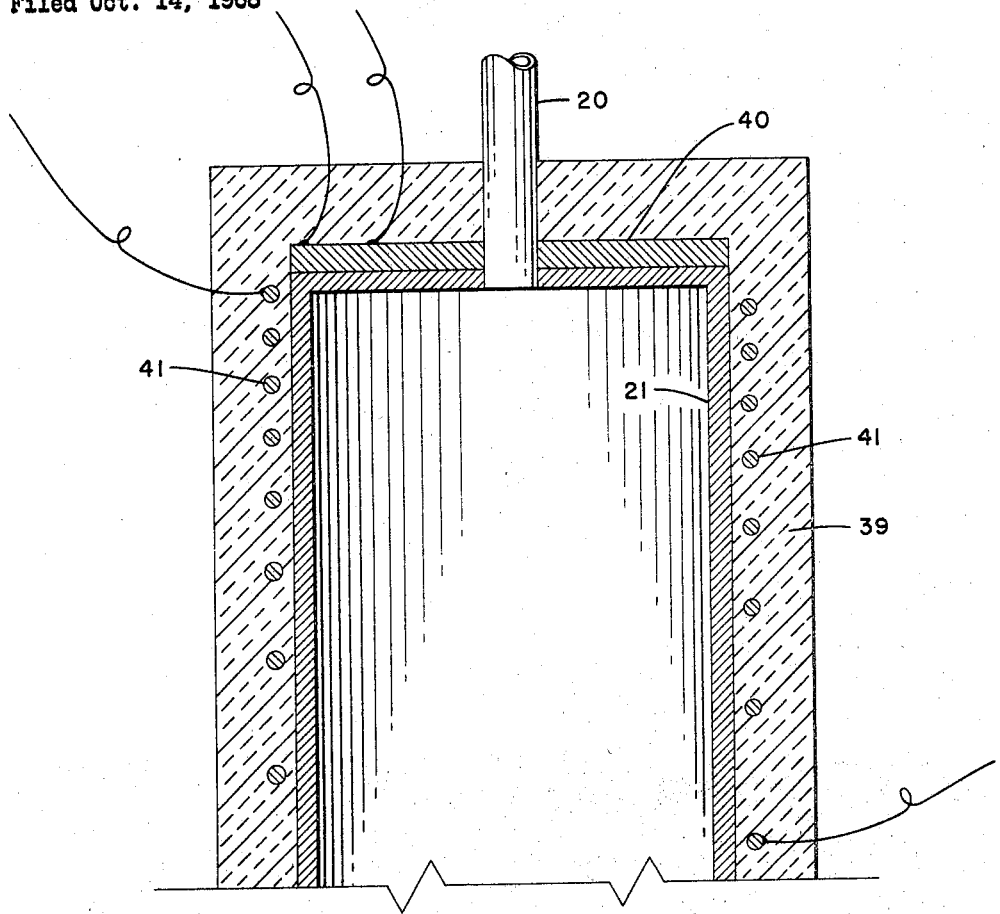
Figure 3:
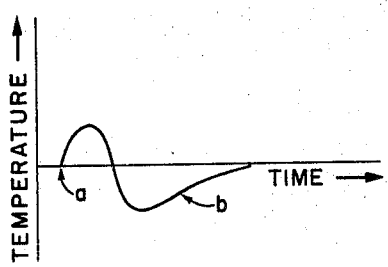
Figure 4:
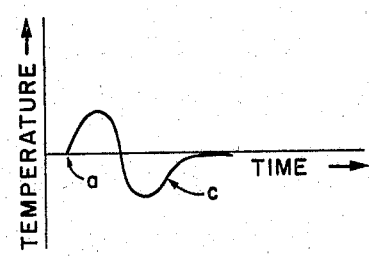

It is accordingly an object of this invention to provide improved method for supplying vaporized feed to a GLC column. Another object of the invention is to provide method and apparatus for controlling conditions at the feed entry to the column. Other aspects, objects, and the several advantages of this invention will become apparent upon study of this disclosure, the appended claims, and the drawing, in which:

FIGURE 1 is a flow diagram in schematic style representing a preferred embodiment of the invention, FIGURE 2 is a sectional elevation illustrating an additional aspect of the invention, and FIGURES 3 and 4 are graphical representations of temperature response within a GLC column.

Reference is now made to the drawing, and to FIGURE 1 in particular. The main carrier gas flow is from inlet conduit 10 via heater 11 to conduit 12 to either valve 13 or valve 14 and then, depending on which valve is open, either via conduit 15 or via conduit 16, sample chamber 17, and conduit 18, to heat exchanger 19. Carrier gas then flows through conduit 20 to the GLC column 21, conduit 22, separator 23, conduit 24, and is thence either discharged from the system by way of conduit 25 or recycled by way of conduit 26 to conduit 10 for re-use, as desired. The feed mixture to be separated is introduced by way of conduit 27 and valve 28 to sample chamber 17, where it is vaporized, as will be discussed later herein, and carried to the GLC column by carrier gas to be separated into its components. The separated component peaks, in carrier gas, are separated at 23 from carrier gas and removed as products at conduit 29; various conventional separation techniques can be used at 23, and do not constitute a part of this invention.

An essential concept of the present invention resides in incorporating vaporized feed into a measured amount of carrier gas slug, i.e. in controlling the size of the feed slug by saturating with vaporized feed, at a fixed temperature and pressure, a predetermined volume of carrier gas; in the event of large sample volume injection, it is sometimes desirable to effect supersaturation of the carrier gas slug with feed. If desired, a predetermined volume of vaporized sample can be mixed with the predetermined volume of carrier gas slug. Then, the slug of mixed feed and carrier gas is passed through heat exchanger 19 to insure that the mixture is at thermal equilibrium at a temperature higher than the boiling point of the highest boiling significant component of the feed. This prevents condensation of a liquid phase on the first "plate" of the GLC column, and at the same time insures a repeatable size of feed slug.

The volume of sample chamber 17 must be large in comparison with the volume of the carrier gas slug passed through it, in order to obtain saturation of the carrier with sample vapor. Sample chamber 17 can comprise an open volume into which liquid or vaporized feed is passed, but preferably comprises a contacting chamber containing sieve trays, packing, or other suitable vapor-liquid contacting means, and in either event is jacketed or otherwise suitably equipped for controlled temperature operation. This control has been indicated schematically in the figure as comprising a heating fluid coil 29 with flow rate therethrough controlled by valve 30, which in turn is adjusted by temperature controller 31 responsive to measurement of temperature in chamber 17; such a temperature control loop is well known in the art.

The volume or frequency of carrier gas slug which is passed through chamber 17 to pick up column feed is determined by the ratio of open times of valves 13 and 14, which open and close alternately, so as to maintain a continuous flow of gas to the GLC column. When valve 13 is open and 14 closed, carirer gas by-passes the sample chamber, while when valve 13 is closed and 14 open, carrier gas is directed through the chamber. This ratio of open-to-closed time of valves 13 and 14 can be controlled by e.g. a cycle controller or timer 32, as known in the art.

Liquid feed rate to chamber 17 via conduit 27 can be controlled by level controller 33. When operating in this manner, controller 33 maintains a small inventory of feed liquid in leg 34, such that feed liquid is continuously circulated from leg 34 via a pump and conduit, not shown, to feed line 27. An ample supply of feed liquid is thus always available in the sample vaporizing chamber 17. Sample chamber 17 can alternatively be operated so as to receive only the desired predetermined sample volume, in which instance the measured carrier gas slug vaporizes the entire sample slug, and controller 33 effects introduction of the carrier gas.

Another embodiment of this invention resides in the use of carrier gas by-pass conduit 35 and valve 36 to prevent pressure surges in the column. Pressure controller 37 senses pressure prevailing in an upper region of column 21, and controls valve 36 to allow carrier gas to by-pass both sample chamber 17 and heat exchanger 19. It will be seen that normal operation of column 21 requires dissolving of a part of the feed mixture in the liquid substrate of the column, and when this occurs, the volume of feed vapor in the column is correspondingly reduced, which can result in pressure surges in the column. These are avoided by use of by-pass 35 as just described.

A further embodiment of this invention resides in rate controller 38. This device senses the rate of change of temperature near the inlet region of column 21. Referring now to FIGURES 3 and 4, there are shown two graphs of temperature with respect to time at a location adjacent the feed inlet of a GLC column. Points $a$ represent a slug of feed in carrier gas reaching the temperature sensing device. The initial effect is a temperature increase due to solution of feed components in the liquid substrate, and is shown by the upward swing from points $a$. Next, a cooling effect is caused by vaporization from the substrate of dissolved feed components, and is shown by the swing of the lines downwardly to below the initial temperature. Lastly, if the column temperature is too low, or if the feed slug is too large for the capacity of the column, liquid condenses on the substrate and packing; this condition is to be avoided, since such condensation of feed liquid can wash the liquid substrate from the packing. It has been found that such a condition, i.e. condensation of feed liquid on the substrate, is reflected by a relatively slow recovery of column temperature because of revaporization of this condensed liquid, as shown by the relatively shallow positive slope portion $b$ in FIGURE 3. In contrast, a column in which no feed has condensed as liquid will recover its temperature relatively rapidly after passage of a feed slug, as shown by the greater positive slope portion $c$ of FIGURE 4. Thus, controller 38 is used to monitor temperature in a portion of the column adjacent the inlet, and whenever this instrument senses a positive slope rate-of-change less than a predetermined value, it can either reset temperature controller 31 to increase the temperature in sample chamber 17, or it can reset cycle controller 32 to decrease the sample slug size, i.e. the ratio of open-to-closed time of valve 14. Of course, such resetting can also be effected manually in response to observation of the temperature rate change near the feed inlet within the column.

Lastly, the embodiment of FIGURE 2 represents an additional safeguard against condensation of feed liquid near the inlet section of the column. Column 21 is surrounded near its feed inlet 20 with thermal insulation 39, and is provided at its end with heater 40 and at its longitudinal wall with heater 41, the heaters being e.g. electrical resistance or a heat transfer liquid. In the embodiment of FIGURE 2, heater 41 is shown as being an electrical resistance heater having its windings spaced closely together at the inlet end, and farther apart as they progress along the column. This arrangement results in a greater rate of heat input near the critical feed inlet, although it will be recognized that the windings can be equally spaced along the column. The important objective here is to maintain a sufficient temperature level, preferably about 50° C. above the boiling point of the highest boiling significant component in the feed, near the head or inlet end of the column, and to assure that components leaving the first section of the column are at equilibrium concentration.

A most basic concept of the present invention resides in the fact that a GLC column of given diameter and substrate composition can accept a certain volume of feed slug without causing condensation of the feed as a liquid on the first "plate" of the column; a larger feed slug will cause feed condensation, with the attendant washing off of substrate from the support, and the separational capacity of the column is thus degenerated. On the other hand, it will readily be recognized that a GLC column, especially one in preparative or large-volume or commercial service, must be operated at as great a throughput as possible in order to be economical and efficient. According to the present invention, it is now possible to operate a GLC column at its maximum throughput consistent with substrate stability, by varying either temperature, size, or frequency of the feed slug. Although it is theoretically possible to calculate the desired operating parameters of a column for a given feed and substrate, determination of optimum conditions is much simpler by either visually observing column operation through a window at the column head to note formation of condensate, or preferably, by observing the temperature response within the column near the head as conditions are varied, as explained in conjunction with FIGURES 3 and 4.

The following example will serve to further illustrate the invention.

The proper amount of carrier gas needed to introduce sample in an amount just sufficient to load but not overload the first plate of the column is determined in the following manner. A predetermined volume of sample liquid is introduced into chamber 17 by way of conduit 27, and the chamber is heated to a sufficient elevated temperature to vaporize the entire sample. Meanwhile, column 21 is brought to equilibrium at its desired temperature and inlet pressure with carrier gas flowing via conduit 35. Carrier gas flow rate is preferably adjusted to a rate such that it will sweep chamber 17 in about 3 minutes or less, which provides for high plate efficiency in column 21; when sample is injected over a period of greater than about 3 minutes per slug, it has been found that plate efficiency decreases. Carrier gas flow rate is measured by flow meter 35A. Valve 13 is now closed, and 14 opened, resulting in slug pressuring the vaporized sample into the column. Flow rate is now measured by flow meter 18A. The following variables are now known: pressure, temperature, and volume of vaporized sample, sample injection time, and pressure, temperature, and total volume of carrier gas needed to satisfy the column to duplicate a given static operating condition with carrier gas only. As an order of magnitude, a 4″ I.D. column packed with 25 weight percent asphalt on celite separates about 140 g. of a mixture of $C_8$, $C_9$ and $C_{10}$ alcohols from a sample chamber volume of about 25 liters at a carrier gas flow rate of about 10 liters per minute.

The invention having thus been described, what is claimed is:

1. In a gas-liquid chromatographic separation, the improved method of providing vaporized feed material to said separation which comprises:
  (a) providing a vapor-liquid contact zone of large volume compared with that of the slug of step (c),
  (b) passing to said contact zone feed liquid to be separated,
  (c) periodically passing to said contact zone a slug of carrier gas of predetermined quantity under conditions effective to substantially saturate said slug with vapor of said feed,
  (d) withdrawing said slug of carrier gas saturated with feed vapor from said contact zone,
  (e) adjusting the temperature of said withdrawn slug to above the boiling point of the highest boiling component of said feed, and
  (f) passing said withdrawn slug to a chromatographic separation zone comprising particulate solids on which is deposited a liquid effective to selectively retard components of said feed.

2. The method of claim 1 wherein, between said periods of passing of step (c), carrier gas is passed to said separation zone so as to by-pass said contact zone.

3. The method of claim 2 wherein the amount of feed passed to said separation zone is controlled responsive to the rate of temperature change in said separation zone at a location near the point of introduction of the slug of step (f), the amount of feed being decreased upon a decrease in the positive slope rate of said temperature change.

4. The method of claim 3 wherein said controlling comprises varying the ratio of sizes of the slug of step (c) and the passing of claim 2.

5. The method of claim 2 wherein the temperature of feed passed to said separation zone is controlled responsive to the rate of temperature change in said separation zone at a location near the point of introduction of the slug of step (f), the temperature of feed being increased upon a decrease in the positive slope rate of said temperature change.

6. The method of claim 2 wherein sufficient additional carrier gas is passed to said separation zone to maintain a constant pressure therein.

7. Chromatographic apparatus comprising:
   (a) column means containing solid particulate matter having deposited on said matter a liquid capable of selectively retarding components of a gaseous mixture passed in contact therewith,
   (b) means connected to said column means for intermittenly passing thereto slugs of gas of predetermined volume containing said mixture,
   (c) vaporizing means, of a volume substantially greater than that of one of said slugs, connected to said means of paragraph (b),
   (d) means for supplying liquid to said vaporizing means, and
   (e) means for intermittently passing a carrier gas from a source to said vaporizing means.

8. The apparatus of claim 7 further including means for intermittenly passing a carrier gas from said source to said column means, including means to alternately divert carrier gas from said source to said column means and to said vaporizing means.

9. The apparatus of claim 8 further including means responsive to temperature in said column means for controlling said means to alternately divert.

References Cited
UNITED STATES PATENTS

| | | | |
|---|---|---|---|
| 3,136,616 | 6/1964 | Thompson | 55—67 |
| 3,366,149 | 1/1968 | Taft et al. | 55—197 X |

JAMES L. DECESARE, Primary Examiner